(12) United States Patent
Bansal et al.

(10) Patent No.: US 7,761,487 B2
(45) Date of Patent: Jul. 20, 2010

(54) PREDICTING OUT OF MEMORY CONDITIONS USING SOFT REFERENCES

(75) Inventors: Jyoti Kumar Bansal, San Francisco, CA (US); David Isaiah Seidman, San Francisco, CA (US); Mark J. Addleman, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 820 days.

(21) Appl. No.: 11/610,085

(22) Filed: Dec. 13, 2006

(65) Prior Publication Data

US 2008/0147705 A1    Jun. 19, 2008

(51) Int. Cl.
*G06F 12/00* (2006.01)
*G06F 17/30* (2006.01)
(52) U.S. Cl. ........................ 707/813; 707/820
(58) Field of Classification Search ............... 707/1–10, 707/100–104.1, 200–206; 711/170–172
See application file for complete search history.

(56) References Cited

U.S. PATENT DOCUMENTS

| 6,430,564 | B1 | 8/2002 | Judge | |
|---|---|---|---|---|
| 7,278,005 | B1 * | 10/2007 | Wolf et al. | 711/170 |
| 7,565,507 | B2 * | 7/2009 | Wolf et al. | 711/170 |
| 2004/0268078 | A1 | 12/2004 | Hassan | |
| 2005/0204341 | A1 | 9/2005 | Broussard | |
| 2005/0240641 | A1 | 10/2005 | Kimura | |
| 2006/0143609 | A1 | 6/2006 | Stanev | |
| 2006/0230087 | A1 | 10/2006 | Andreasson | |

OTHER PUBLICATIONS

Hudson et al., Incremental Collection of Mature Objects, 1992, ACM, 388-403.*
Martin Hirzel et al., Connectivity-based garbage collection, Nov. 2003, ACM, 359-373.*
Goetz, "Java theory and practice: Plugging memory leaks with soft references," http://www-128.ibm.com/developerworks/java/library/j-jtp01246.html, Jan. 24, 2006, pp. 1-5.
"Tuning Garbage Collection with the 1.3.1 Java Virtual Machine," http://java.sun.com/docs/hotspot/gc/incex.html, Sun Microsystems, Inc., 1999, pp. 1-10.

(Continued)

*Primary Examiner*—Jean B Fleurantin
(74) *Attorney, Agent, or Firm*—Vierra Magen Marcus & DeNiro LLP

(57) ABSTRACT

A near out-of-memory condition in a memory space is detected by creating softly reachable objects which are garbage collected when the memory space is becoming full. The softly reachable objects are objects that can be cleared at the discretion of the garbage collector when heap memory is running low. An agent process of an application can create soft reference objects which reference the softly reachable objects, and periodically poll the soft reference objects to determine if the softly reachable objects have been cleared. If they have been cleared, the agent reports to the application so that a graceful shutdown of the application can be initiated. A report can also be sent to a user interface or other output device. Additional information regarding the memory space can be gained by using softly reachable objects of different sizes and/or ages. Further, a wait period for the polling can be set adaptively.

42 Claims, 9 Drawing Sheets

OTHER PUBLICATIONS

Kabutz, "OutOfMemoryError Warning System," The Java Specialists' Newsletter (Issue 092), Jul. 20, 2004, pp. 1-8.

Pawlan, "Reference Objects and Garbage Collection," Sun Microsystems, Inc., Aug. 1998, pp. 1-16.

"Using jconsole," http://java.sun.com/j2se/1.5.0/docs/guide/management/jconsole.html, printed Nov. 16, 2006, pp. 1-14.

Venners, "Java's garbage-collected heap," JavaWorld.com, Aug. 1, 1996, pp. 1-8.

* cited by examiner

PREDICTING OUT OF MEMORY CONDITIONS USING SOFT REFERENCES

BACKGROUND OF THE INVENTION

Description of the Related Art

Out-of-memory conditions are among the most pernicious problems facing production applications such as Java applications, and can result in severe consequences such as corruption of data, downtime and loss of productivity. In object-oriented programming techniques, an out-of-memory condition can occur when there is insufficient heap space to allocate to a new object. The heap is a memory space for storing objects which are created during the runtime of an application. A garbage collection, or memory recycling, process is performed to manage the heap by identifying objects that are no longer in use and reclaiming the memory space currently allocated to such objects. However, once an out-of-memory condition occurs, it is too late to take corrective action such as performing a graceful shutdown of the application.

One current approach to predicting an out-of-memory condition involves heavily instrumenting an application to closely monitor its activities. However, this approach results in high overhead costs, in terms of processing and memory resources, as it duplicates much of the work of the garbage collector, and is therefore not suitable for a production environment. Another approach to predicting an out-of-memory condition involves profiling. For example, the Java Virtual Machine Profiler Interface (JVMPI) can be used to obtain copies of the data in the memory at different points in time. Subsequently, a statistical trend analysis can be performed on the data to predict the out-of-memory condition. However, this approach also results in high overhead costs and can destabilize the Java Virtual Machine (JVM). As a result of the shortcomings of such approaches, it is difficult for an administrator to safely manage a single application server or a cluster of application servers.

SUMMARY OF THE INVENTION

The present invention addresses the above and other issues by providing a system and method for predicting an out-of-memory condition. An efficient, automated production tool is provided for predicting an out-of-memory condition with good reliability and minimal overhead costs by taking advantage of existing constructs such as softy reachable objects.

In one embodiment, a computer-implemented method for managing memory includes creating at least one object of a first type during a runtime of an application, where a memory space is allocated for storing the at least one object and other objects of at least one other type which are created during the runtime of the application. For example, the at least one object of the first type can include at least one softly reachable object, and the creating can include creating at least one soft reference object which references the at least one softly reachable object. The objects of at least one other type can include strongly reachable objects, for instance. The method further includes performing a garbage collecting process which is designed to clear the at least one object of the first type from the memory space when the memory space is close to an out-of-memory condition, determining whether the at least one object of the first type has been cleared from the memory space, and reporting regarding whether the memory space is close to the out-of-memory condition, responsive to the determining.

The determining can include polling the at least one soft reference object to determine whether the at least one softly reachable object has been cleared from the memory space.

The reporting can include reporting that the memory space is close to the out-of-memory condition when it is determined that the at least one object of the first type has been cleared from the memory space. In one approach, a graceful shutdown of the application is initiated, responsive to the reporting.

The method can further include creating at least one new object of the first type after it is determined that the at least one object of the first type has been cleared from the memory space, and determining if the at least one new object of the first type has been cleared from the memory space at a prescribed time after it has been determined that the at least one object of the first type has been cleared from the memory space. In this case, the reporting can include reporting that the memory space is close to the out-of-memory condition when it is determined that the at least one new object of the first type has been cleared from the memory space. Thus, the reporting is based on multiple objects being cleared within a specified time period.

In another approach, the reporting can include providing different reports indicating with different degrees of confidence that the memory space is close to the out-of-memory condition.

In yet another approach, different objects of the first type are stored in different memory pools of the memory space, and separate reports are provided regarding whether the different memory pools are close to being full.

In another embodiment, a computer-implemented method for managing memory includes creating multiple objects of the first type as mentioned previously, performing a garbage collecting process as mentioned previously, determining one or more of the objects of the first type which have been cleared from the memory space, and reporting regarding whether the memory space is close to the out-of-memory condition, responsive to the determining.

For example, the reporting can identify a degree to which the memory space is close to the out-of-memory condition based on how many of the objects of the first type have been cleared from the memory space.

In one approach, the method includes determining a wait period based on how many of the objects of the first type are determined to have been cleared from the memory space, creating a new group of objects of the first type, waiting for the wait period before determining how many of the new group of objects of the first type have been cleared from the memory space, and reporting regarding whether the memory space is close to the out-of-memory condition, responsive to the determining how many of the new group of objects of the first type have been cleared from the memory space. Thus, an adaptive wait period can be set.

Further, the objects of the first type can include objects which are cleared from the memory space according a certain priority in the garbage collecting process, e.g., according to different sizes of the objects or different memory pools of the memory space in which the objects are stored.

In other embodiments, at least one processor readable storage device having processor readable code embodied thereon may be provided for programming at least one processor to perform the above-mentioned methods.

DETAILED DESCRIPTION

The present invention provides a system and method for predicting an out-of-memory condition.

Figure 1:
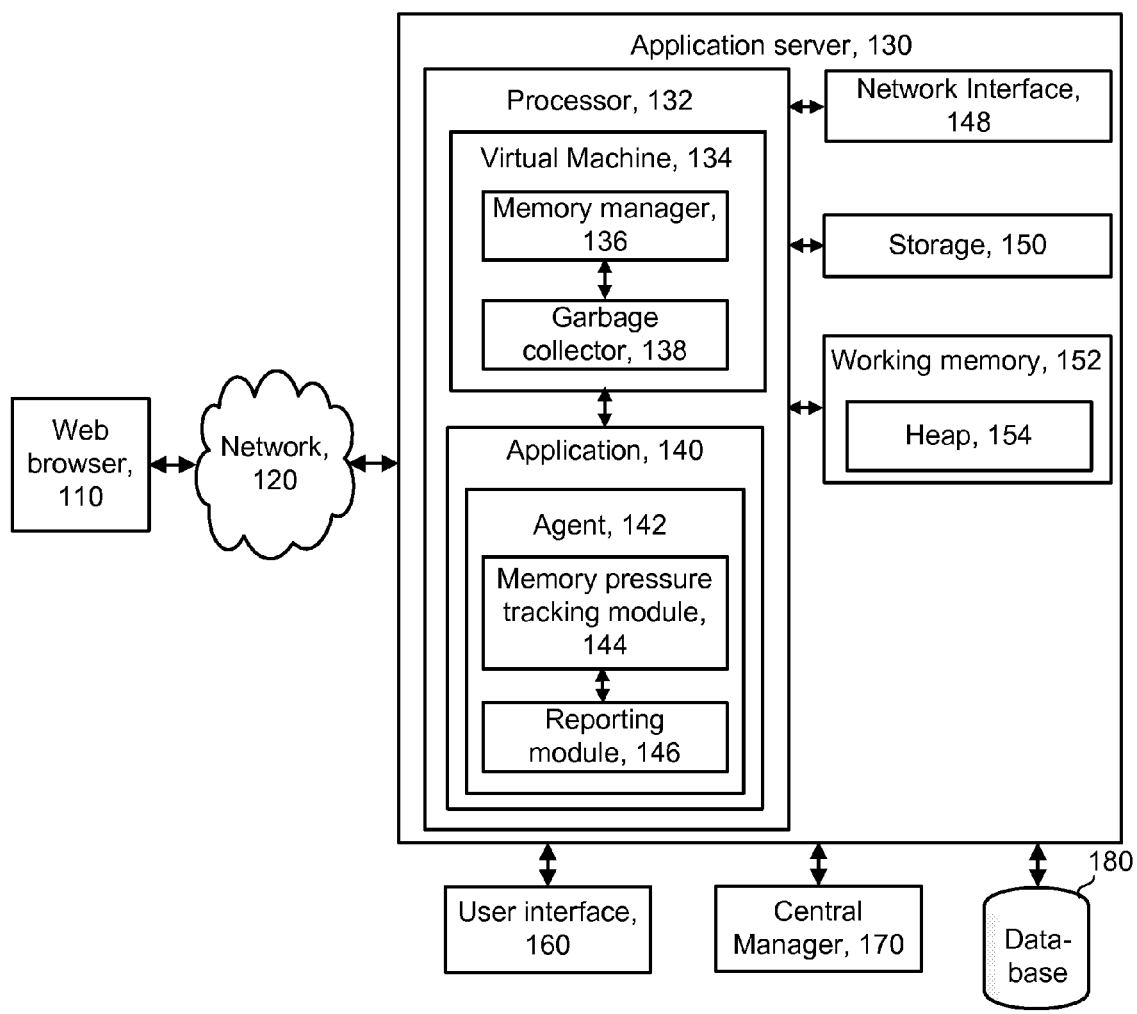
FIG. 1 depicts a computer system in which an out-of-memory condition is predicted.

FIG. 1 depicts a computer system in which an out-of-memory condition is predicted. A client such as a web browser 110, in response to user commands, exchanges messages with an application 140 at an application server 130 via a network 120 such as the Internet. The web browser 110 typically accesses the network 120 via an Internet Service Provider, not shown. While FIG. 1 depicts a single web browser communicating with a single application server, it is also possible for multiple web browsers or other clients, including automated clients such as other servers, to communicate with the application server 130 as well as other servers. In an enterprise application configuration, for example, typically clusters of application servers are set up at different geographic locations to serve a large population of users, while providing load balancing, backup protection and quick response times.

The application 140 can run in a virtual machine 134 on one or more processors, such as an example processor 132. The processor 132 can communicate with a network interface 148, which sends and receives messages via the network 120, for instance, or other network or networks, a storage device 150, such as non-volatile memory (e.g., hard disk or portable media) and a working memory 152 (e.g., volatile memory such as RAM), which includes a heap 154. For example, the working memory 152 can store software instructions for execution by the processor 132 after they are loaded from the storage device 150.

The heap 154 stores objects which are created by the application 140 as it executes, e.g., during the application runtime. Generally, the heap 154 may be considered to be part of a memory runtime environment which includes memory resources which are used for storing application runtime data. A memory runtime environment can span one or more computing machines such as servers. Further, there can be multiple memory runtime environments per computing machine or multiple computing machines per memory runtime environment. The heap 154 can therefore be considered to be one logical heap.

The virtual machine 134 includes a memory manager module 136 and a garbage collector module 138. The memory manager module 136 performs tasks such allocating memory space in the heap 154. The memory manager module 136 interacts with the garbage collector module 138, which manages the heap 154 by identifying objects that are no longer in use and reclaiming the memory space currently allocated to such objects. The virtual machine 134 generally refers to software that isolates an application from a computer platform, thereby allowing an application to run on different computer platforms. One example is the Java Virtual Machine (JVM), from Sun Microsystems. The JVM includes a byte-code instruction set, a set of registers, a stack, a garbage-collected heap, and an area for storing methods. In particular, the JVM manages two kinds of memory: heap and non-heap memory, both created when it starts. Heap memory is the runtime data area from which the JVM allocates memory for all class instances and arrays. The heap may be of a fixed or variable size. The garbage collector is an automatic memory management system that reclaims heap memory for objects. Non-heap memory includes a method area shared among all threads and memory required for the internal processing or optimization for the JVM. Non-heap memory stores per-class structures such as a runtime constant pool, field and method data, and the code for methods and constructors. The method area is logically part of the heap but, depending on implementation, a JVM may not garbage collect or compact it. Like the heap, the method area may be of fixed or variable size. The memory for the method area does not need to be contiguous.

Other examples include Microsoft's Java Virtual Machine (MSJVM) and the Common Language Runtime (CLR) of Microsoft's .NET software development platform. Various references herein which are specific to the JVM should be construed as relating to an example implementation only, as other implementations are possible.

The application 140 includes an agent software process 142 which, in turn, includes a memory pressure tracking module 144 and a reporting module 146. As described in detail further below, the memory pressure tracking module 144 tracks a memory pressure of the heap 154 such as by predicting an out-of-memory condition which may be imminent at the heap 154. Memory pressure indicates the degree to which a memory space is becoming full (e.g., there is more pressure when the memory is more full). The reporting module 146 initiates the reporting of information obtained by the memory pressure tracking module 144. For example, as discussed further below, this information can indicate that an out-of-memory condition has been predicted for the heap, that is, the heap is close to being out of memory. The prediction can include a degree of confidence. Further, a severity of a near out-of-memory condition can be indicated. The information obtained by the memory pressure tracking module 144 can be reported to the application 140, e.g., to an executing thread or process, to a user interface 160 such as a user interface display, and/or to a speaker, printer, network interface, monitor or other suitable output device. The information from the memory pressure tracking module 144 can also be reported to a central manager 170 and a database 180.

A user interface display can use any known display scheme, whether graphical, tabular or the like. For example, an out-of-memory condition that has been predicted for the heap can be provided as a flashing red message to alert an administrator of the problem. The administrator, in turn, can take corrective action such as initiating a graceful shutdown of the application and/or starting a new instance of the application. Or, these corrective actions can be taken automatically. The degree of confidence, severity and/or memory pressure can be indicated by a bar chart, where a greater bar height denotes a greater value, or an x-y graph which displays confidence, severity and/or memory pressure data at different time points. Other graphical tools include dashboards which represent information on a dial analogous to a gauge in a car's instrument panel so that a current data value is provided in the context of a range of possible values. Audible alerts and synthesized voice messages at an administrator's console can also be provided. In another possible approach, the reporting initiated by the reporting module 146 causes an electronic message to be sent to an administrator's cell phone, beeper, e-mail address or the like.

The agent 142 may also gather data, such as response times to client requests, from the application 140 via instrumentation of the application 140 for processing locally and/or reporting to the central manager 170. Generally, the agent 142 can process data locally as well as communicate data to the central manager 170 for processing thereat, if desired. Moreover, agents of multiple application servers and/or applications can communicate with the central manager 170 so that an aggregate picture can be obtained of the activities of the multiple application servers and/or applications.

The application 140 can execute in response to messages received from the web browser 110, in one possible approach. For example, a message from the web browser 110 may be a request for information, such as a web page, in which case the application 140 responds by performing a process for retrieving the requested information. If the information can be located, it is provided to the web browser 110. The application 140 can also communicate with the database 180 or another application to retrieve requested information.

Note that the user interface 160, central manager 170 and database 180 are depicted as communicating directly with the application server 130. In practice, it is also possible for communication with these components to occur via the network 120 or another network or networks.

The storage device 150 and/or working memory 152 may be considered to be a processor readable storage device having processor readable code embodied thereon for programming the processor 132 to perform methods for providing the functionality discussed herein. Generally, the functionality described herein may be implemented using one or more processor readable storage devices having processor readable code embodied thereon for programming one or more processors. The processor readable storage devices can include computer readable media such as volatile and nonvolatile media, as well as removable and non-removable media. For example, computer readable media may comprise computer storage media and communication media. Computer storage media includes volatile and nonvolatile, removable and non-removable media implemented by any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Figure 2:
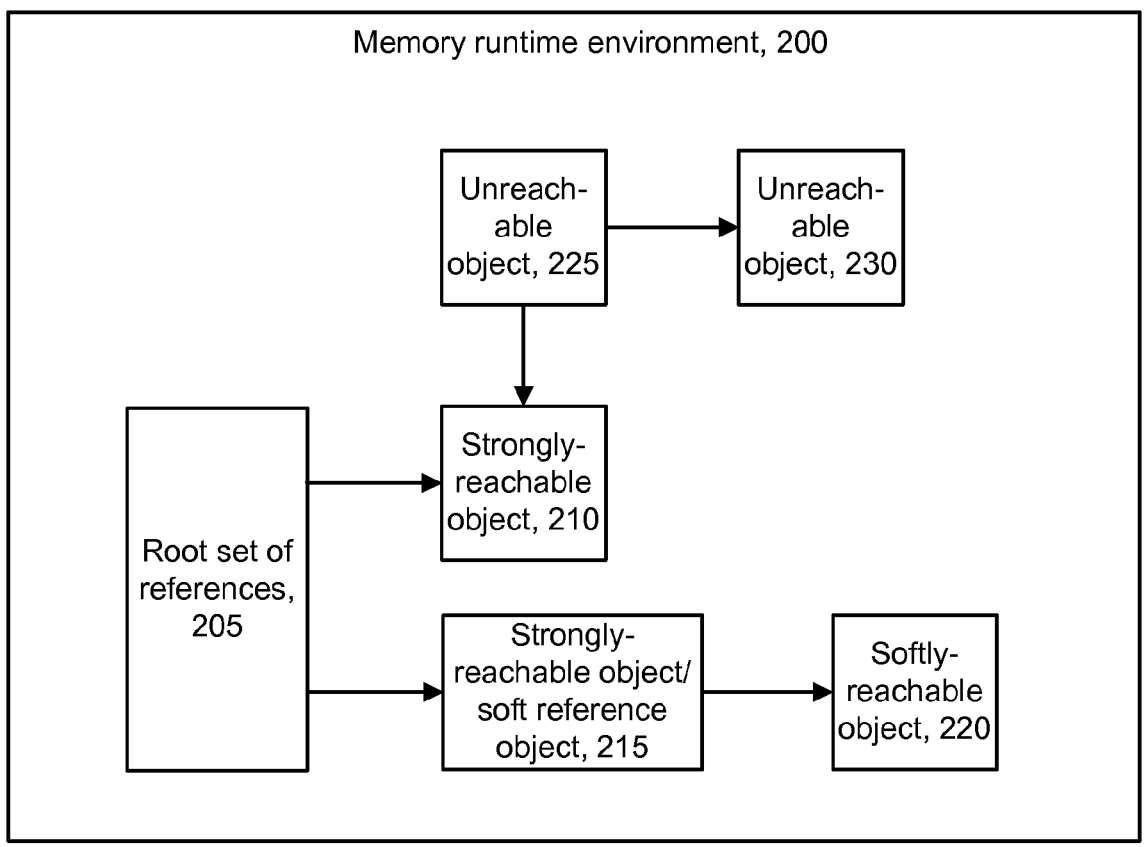
FIG. 2 depicts a memory runtime environment which includes a softly reachable object.

FIG. 2 depicts a memory runtime environment which includes a softly reachable object. The memory runtime environment 200 can include a memory space of the heap 154 in the working memory 152 of the application server 130 of FIG. 1, in one example. As mentioned, a garbage collection process is implemented to manage the heap 154 by identifying objects that are no longer in use and reclaiming the memory space currently allocated to such objects. An object is in use if it can be accessed or reached by the application in its current state.

In a simplified example, the memory runtime environment 200 includes a root set of references 205, strongly reachable objects 210 and 215, softly reachable object 220 and unreachable objects 225 and 230. In particular, an executing program can include a set of threads, each of which is actively executing a set of methods (one having called the next). Each method can have arguments or local variables that are references to objects. These references belong to the root set of references 205 because they are immediately accessible to the program. Further, all objects referenced by the root set of references 205 are reachable by the program in its current state and must not be collected by the garbage collector. Also, those objects might contain references to still other objects, which are also reachable, and so on. All other objects on the heap are considered to be unreachable, and therefore eligible for garbage collection. Garbage collection algorithms vary, but generally involve identifying the objects that are reachable from the root set and reclaiming the space occupied by any other objects. Essentially any type of garbage collection algorithms can be used. Further, the garbage collector can run on its own thread in parallel to the executing application, in one possible approach. Referring to the memory runtime environment 200, objects 210, 215 and 220 are reachable from the root set of references 205, while objects 225 and 230 are not. Objects 225 and 230 are therefore eligible to be garbage collected.

Further, an object can be identified as a reference object when it encapsulates a reference to some other object, which is called the referent. The referent of a reference object is specified when the reference object is created. For example, object 215 is a reference object and object 220 is its referent. Further, a reference object can be of different types. One possible type is a soft reference object, which is treated such that the garbage collector clears all soft reference objects before throwing an out-of-memory error. In Java, the java-.lang.ref.SoftReference class is used to define a soft reference, and the OutOfMemoryError function signals that the JVM cannot allocate an object because it is both out of memory and unable to make more memory available through garbage collecting.

Moreover, different strengths of object "reachability" are recognized and handled differently by the garbage collector. When an object is reachable from the root set by some chain of ordinary references (with no reference objects involved), that object is strongly reachable. For example, objects 210 and 215 are strongly reachable. When all paths to an object have one or more soft reference objects, but no weak or phantom reference objects, the object is softly reachable. For example, object 220 is softly reachable from soft reference object 215. In Java, weak and phantom reference objects are other types of reference objects. When heap memory is running low, the garbage collector can, at its discretion, find softly reachable objects and clear them (by setting their reference field to null). The soft reference object remains when the softly reachable object is cleared. Weakly reachable objects are always reclaimed, even when the heap memory is not running low and phantomly reachable objects are objects that have been finalized, but not reclaimed. Strongly reachable objects must not be collected by the garbage collector.

Thus, objects 225 and 230 would be garbage collected because they are unreachable, and object 220 would be eligible for garbage collecting if the heap memory is running low, that is, the garbage collector realizes that it cannot allocate additional memory for newly created objects without reclaiming the memory space of one or more existing objects. Objects 210 and 215 are not eligible for garbage collecting, even if the heap memory is running low.

Soft references are useful for storing data in cache. To illustrate, soft references are useful in web-based programs where, for example, an applet creates an image to display on a web page. When the user opens the web page, the applet code gets the image and displays it. If the code also creates a soft reference to the image, the garbage collector has the option to reclaim or not reclaim the memory allocated to the image when the user moves to another web page. If the user returns to the web page where the image is, the applet code uses the SoftReference.get method, in the Java context, to check the soft reference to find out if the image is still in memory. If the image has not been reclaimed by the garbage collector, it is quickly displayed on the page. Otherwise, if the image has been reclaimed, the applet code gets it again.

While the terms "softly reachable object", "soft reference" and the like are associated particularly with the JVM, the concept refers generally to a lower priority type of object which is eligible to be garbage collected when there is a need to reclaim memory. The concept is therefore applicable to different virtual machine environments and memory runtime environments.

Figure 3:
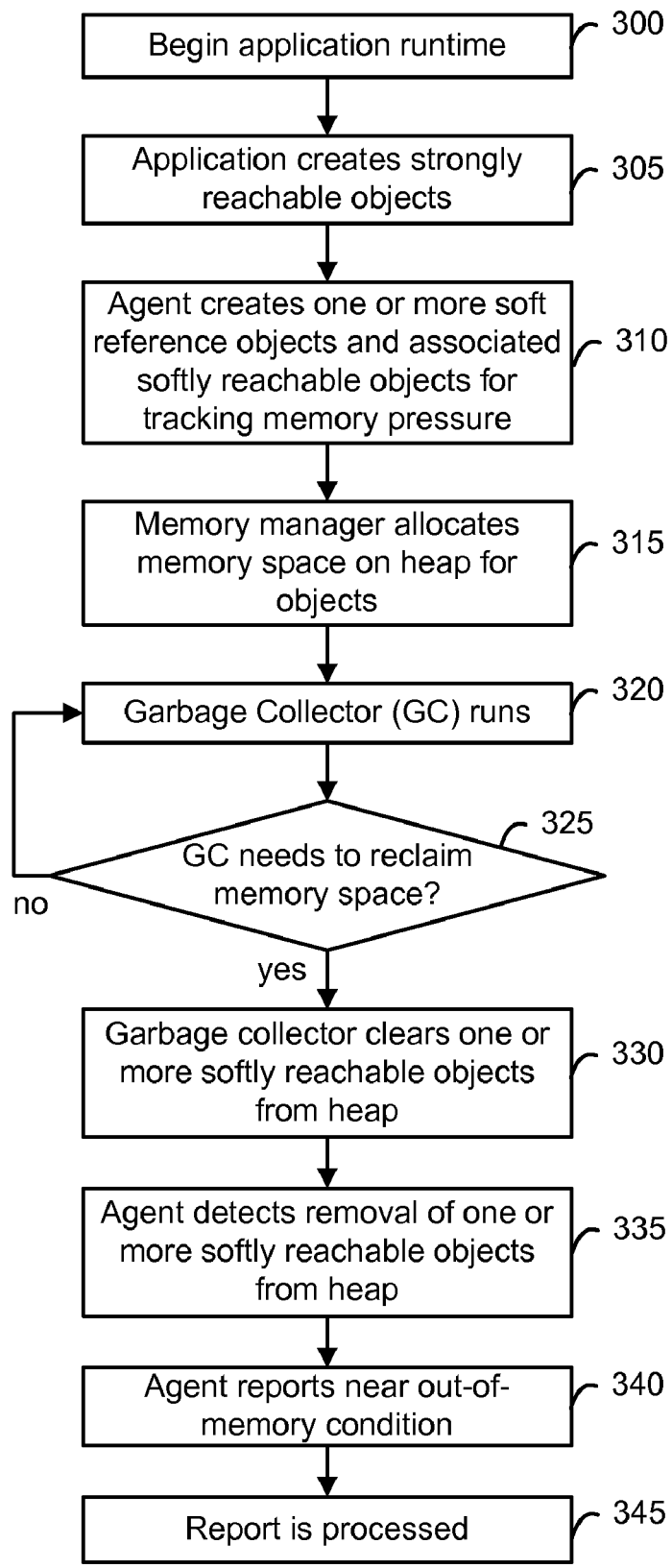
FIG. 3 depicts a process for predicting an out-of-memory condition when a garbage collector clears a softly reachable object.

FIG. 3 depicts a process for predicting an out-of-memory condition when a garbage collector clears a softly reachable object. Note that in this and the other flowcharts, the steps shown are not necessarily performed as discrete steps and are not necessarily performed in the order shown. Moreover, simplifications have been made. At step 300, an application runtime begins. At step 305, the application creates strongly reachable objects. These objects, as well as other types of objects, can be created from time to time as the application runs. For example, in a web based application, the creation of objects may depend on user inputs via a browser. At step 310, the agent creates one or more soft reference objects (e.g., object 215 in FIG. 2) and associated softly reachable objects (e.g., object 220) for tracking memory pressure. A softly reachable object is a specific example of type of object which is created during a runtime of an application, where a garbage collecting process is designed to clear objects of that type from the memory space when the memory space is close to an out-of-memory condition. The techniques described herein are generally applicable to such types of objects, regardless of whether they are referred to as softly reachable objects or the like. Moreover, a strongly reachable object is a specific example of another type of object which is created during the runtime of an application, where a garbage collecting process does not clear objects of that type from the memory space, even when the memory space is close to an out-of-memory condition.

The softly reachable objects are created specifically for tracking and are otherwise dummy objects that do not do work for the application. Note that the use of an agent for creating and tracking softly reachable objects is not required as other processes may be used as well. The one or more softly reachable objects can have some non-negligible size based on the specific implementation.

At step 315, the memory manager allocates memory space on the heap for the created objects, e.g., the strongly reachable, soft reference and softly reachable objects. At step 320, the garbage collector runs. As mentioned, the garbage collector (GC) can run on its own thread in parallel to the executing application, in one possible approach. At decision step 325, if the garbage collector determines that it does not need to reclaim memory space to allocate to new objects (since the heap is not close to full), it continues running, at step 320. However, if the garbage collector does need to reclaim memory space to allocate to new objects (since the heap is close to full), it clears one or more softly reachable objects from the heap, at step 330. At step 335, the agent detects the removal of the one or more softly reachable objects from the heap and, at step 340, reports a near out-of-memory condition, such as to the application, via a user interface and/or other output means, as discussed. At step 345, the report is processed. For example, a graceful shutdown of the application may be performed and/or a new instance of the application may be created. Most applications are deployed in such a way that they automatically restart if they fail. For example, a deployment controller could create another instance of the application. Note that step 335 involves detecting removal of the one or more softly reachable objects which were created in step 310 for tracking memory pressure. It is also possible for the application to create softly reachable objects for non-tracking purposes.

Further details regarding the creation and tracking of softly reachable objects for tracking memory pressure are provided below.

Figure 4:
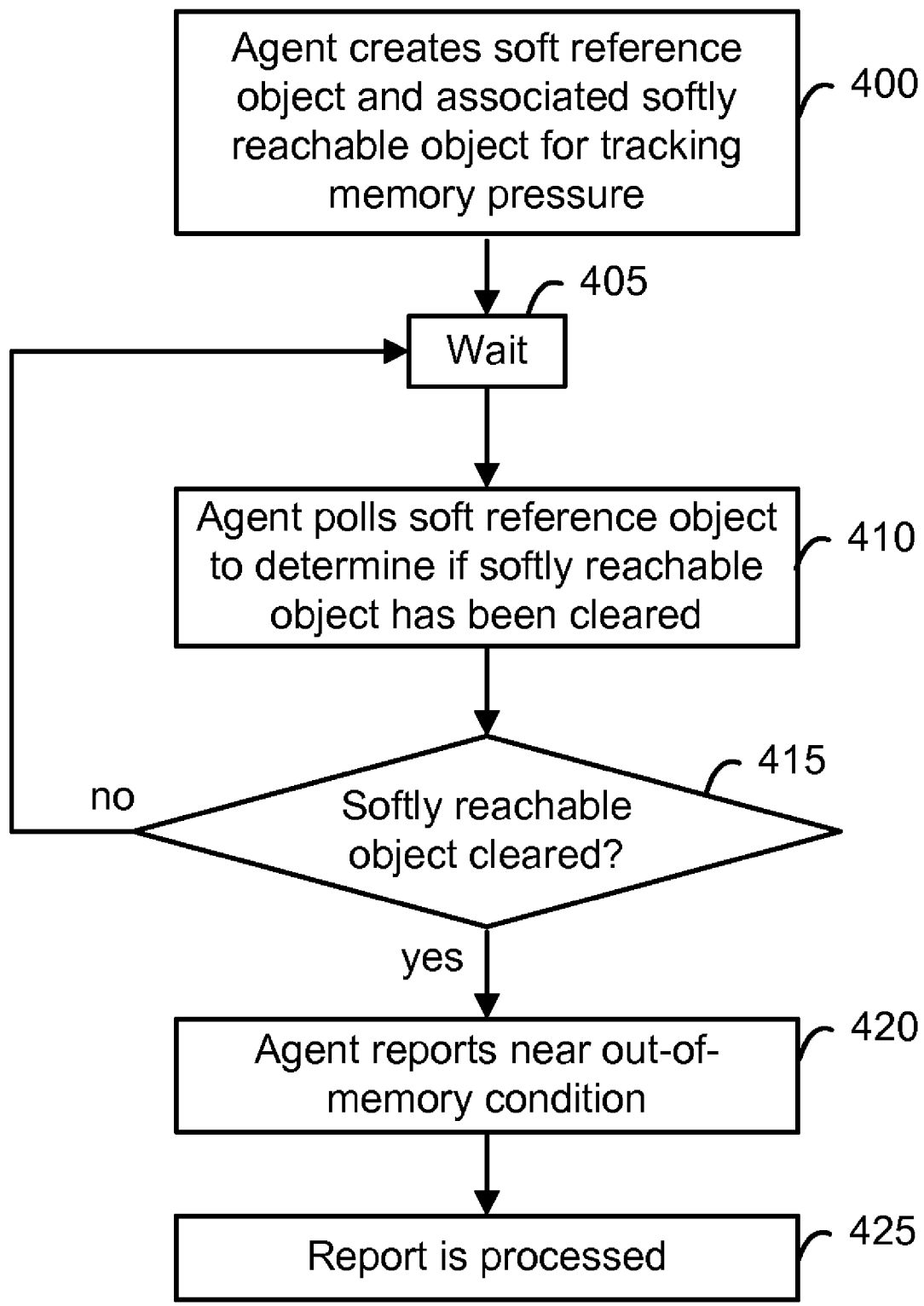
FIG. 4 depicts a process for creating and monitoring a softly reachable object.

FIG. 4 depicts a process for creating and monitoring a softly reachable object. In this approach, the clearing of one or more softly reachable objects triggers a report of a near out-of-memory condition. In particular, at step 400, the agent creates a soft reference object and associated softly reachable object for tracking memory pressure. After a wait period at step 405, e.g., of a few seconds, the agent polls the soft reference object, such as by using the SoftReference.get method, in a JVM context, to determine if the softly reachable object has been cleared, at step 410. At decision step 415, if the softly reachable object has been cleared, e.g., the reference field of the soft reference object is set to null, the agent reports a near out-of-memory condition, at step 420, and the report is processed at step 425, as discussed. If the softly reachable object has not been cleared at decision step 415, a wait is implemented again at step 405, and the agent polls the soft reference object again at step 410. Generally, appropriate wait periods in this and other examples can be set based on the particular implementation. In one possible variation, the process can be modified by creating multiple soft reference objects and associated softly reachable objects for tracking memory pressure at step 400 and determining if the multiple softly reachable objects are cleared at decision step 415.

Figure 5:
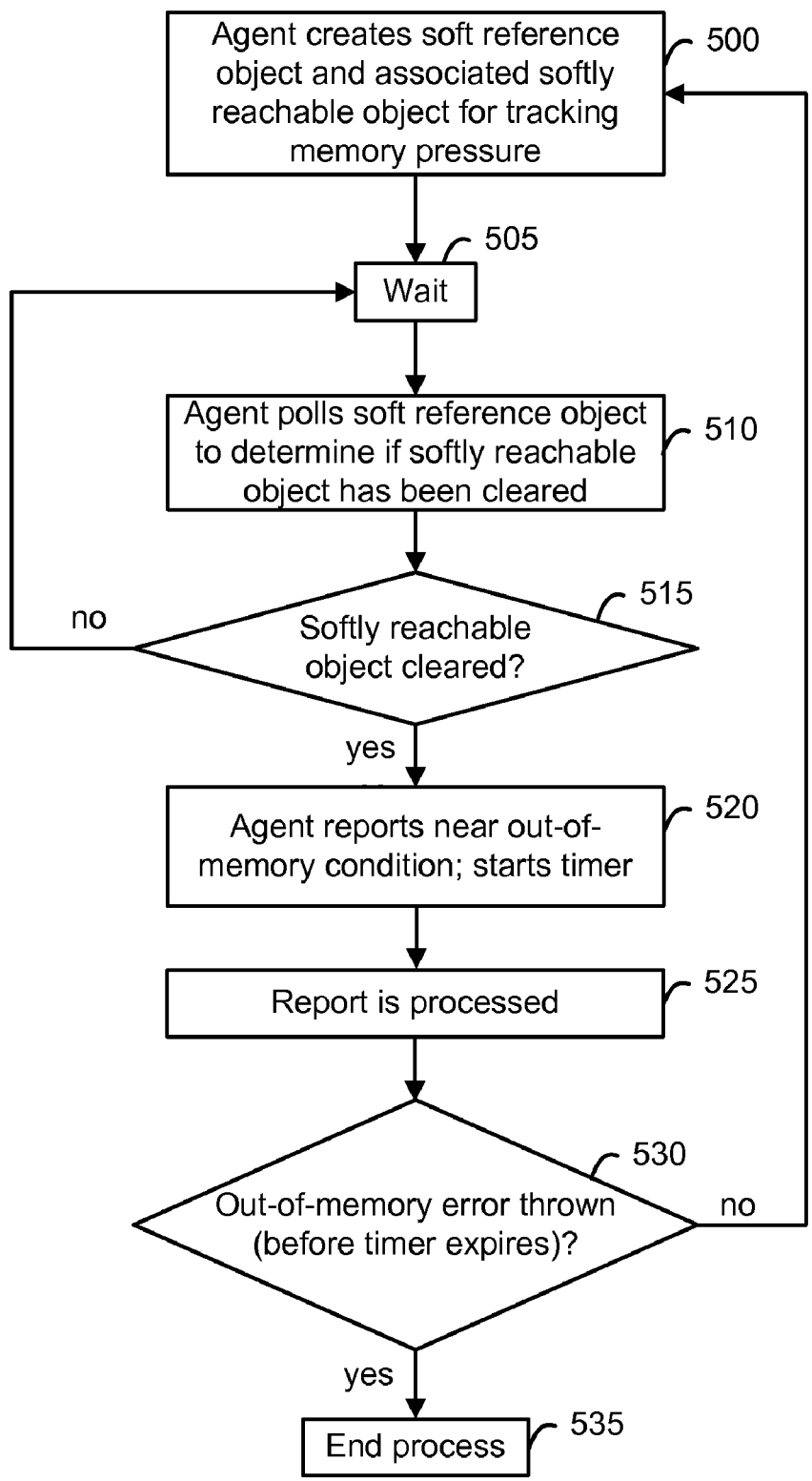
FIG. 5 depicts a process for creating a new softly reachable object when an out-of-memory condition is predicted but not reached.

FIG. 5 depicts a process for creating a new softly reachable object when an out-of-memory condition is predicted but not reached. In this approach, the process for creating and tracking a softly reachable object is repeated when the memory does not reach the out-of-memory condition and an out-of-memory error for the memory space is therefore not thrown. This approach can be used, e.g., to determine the length of time that the memory pressure is occurring by recreating an object and a soft reference to it within some time period after an initial soft reference was cleared. This can be useful to increase confidence that a memory problem is occurring, and to support later warnings if there is a recovery from the initial memory pressure that led to the initial softly reachable object being cleared.

Steps 500-515 and 525 correspond to steps 400-415 and 425, respectively, of FIG. 4. Step 520 corresponds to step 420 but includes starting a timer, e.g., of a few seconds. At an additional decision step 530, the agent determines whether the out-of-memory error has been thrown (before the timer expires). In the JVM context, the out-of-memory error is the java.lang.OutOfMemoryError. Other environments may use an analogous error. If the out-of-memory error has been thrown, the process ends at step 535.

On the other hand, if the out-of-memory error has not been thrown at decision step 530, the agent creates a new soft reference object and associated softly reachable object for tracking memory pressure at step 500 and the process is repeated. Thus, memory pressure can continue to be tracked when the heap approaches but then retreats from the brink of an out-of-memory condition. The agent may also send an additional report indicating that the memory has recovered from the near out-of-memory condition.

Figure 6:
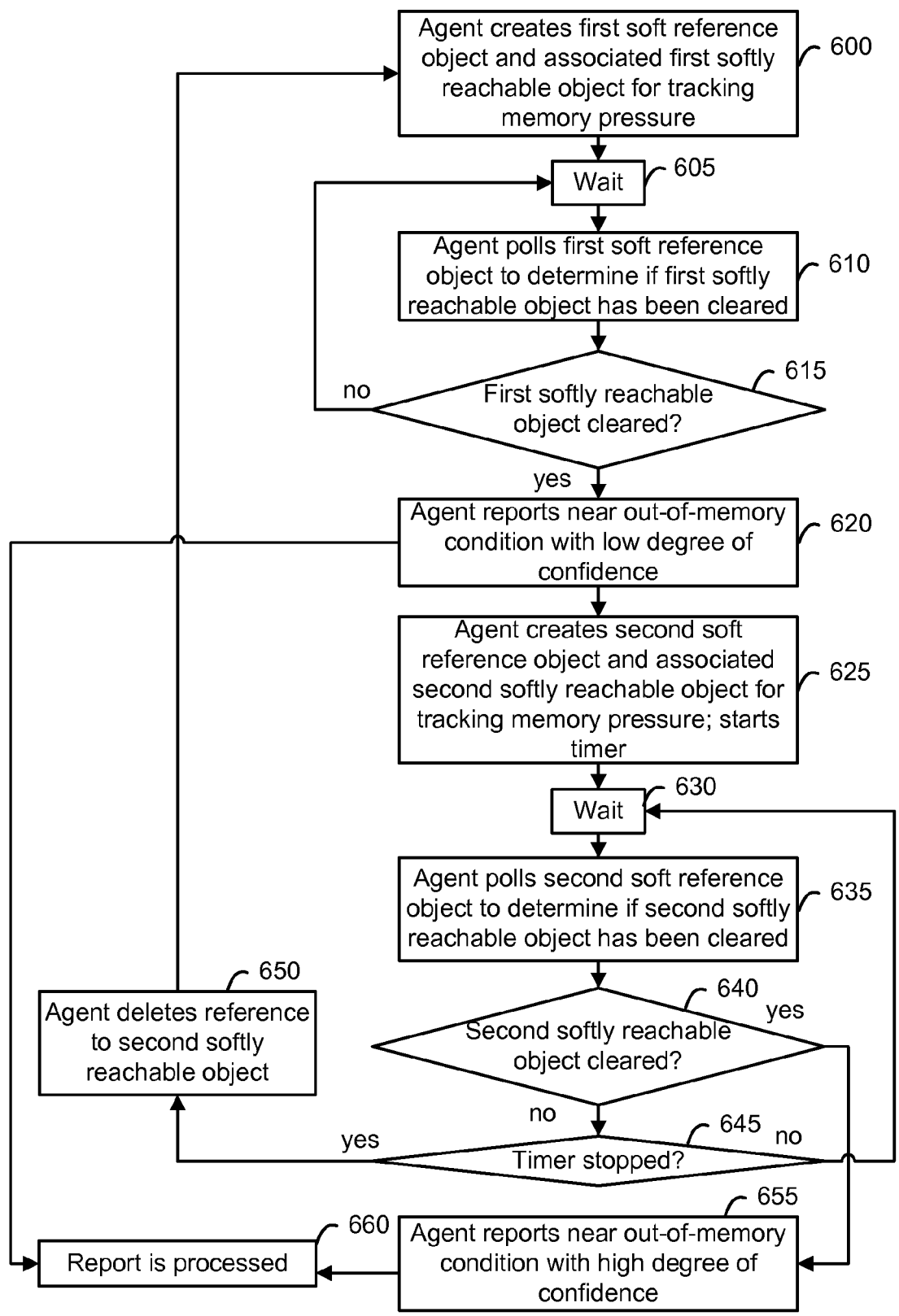
FIG. 6 depicts a process for predicting an out-of-memory condition with different degrees of confidence.

FIG. 6 depicts a process for predicting an out-of-memory condition with different degrees of confidence. In this approach, multiple softly reachable objects are created one after another so that an out-of-memory condition can be determined with different degrees of confidence. Further, the length of time that the memory pressure is occurring can be determined.

At step 600, the agent creates a first soft reference object and an associated first softly reachable object for tracking memory pressure. After a wait period at step 605, the agent polls the first soft reference object to determine if the first softly reachable object has been cleared, at step 610. If the first softly reachable object has not been cleared, at decision step 615, the wait of step 605 and polling of step 610 are repeated. One the other hand, if the first softly reachable object has been cleared, the agent reports a near out-of-memory condition, for instance, with a low degree of confidence, at step 620. At step 660, the report is processed. Also, at step 625, the agent creates a second soft reference object and an associated second softly reachable object for tracking memory pressure, and starts a timer, e.g., which stops in several seconds, depending on the particular implementation. After a wait period at step 630, which is less than the timer countdown duration, the agent polls the second soft reference object to determine if the second softly reachable object has been cleared, at step 635.

If the second softly reachable object has not been cleared, at decision step 640, and the timer has stopped, at decision step 645, the agent deletes the reference to the second softly reachable object, at step 650. At this point, the process begins again at step 600. In this case, the second softly reachable object has not been cleared within a predetermined time after it is determined that the first softly reachable object has been cleared.

If the second softly reachable object has not been cleared, at decision step 640, but the timer has not stopped, at decision step 645, the wait period at step 630 is implemented again and the agent polls the second soft reference object again at step 635. This cycle is repeated until either the second softly reachable object has been cleared or the timer has stopped.

At decision step 640, if the second softly reachable object has been cleared, the agent reports a near out-of-memory condition with a high degree of confidence, at step 655. The confidence is high rather than low because clearing of the second softly reachable object within a given time period after the clearing of the first softly reachable object indicates a near out-of-memory condition with greater confidence or probability than clearing of only the first softly reachable object. That is, it can be concluded that the memory pressure has continued for some time. At step 660, the report is processed.

The example creates softly reachable objects at two time points to provide two levels of confidence but can be extended to additional levels. Furthermore, characteristics of the softly reachable objects can be set based on specific knowledge of the garbage collector and virtual machine. For example, the softly reachable objects may have different sizes and the garbage collector may clear the softly reachable objects based on their size.

Figure 7:
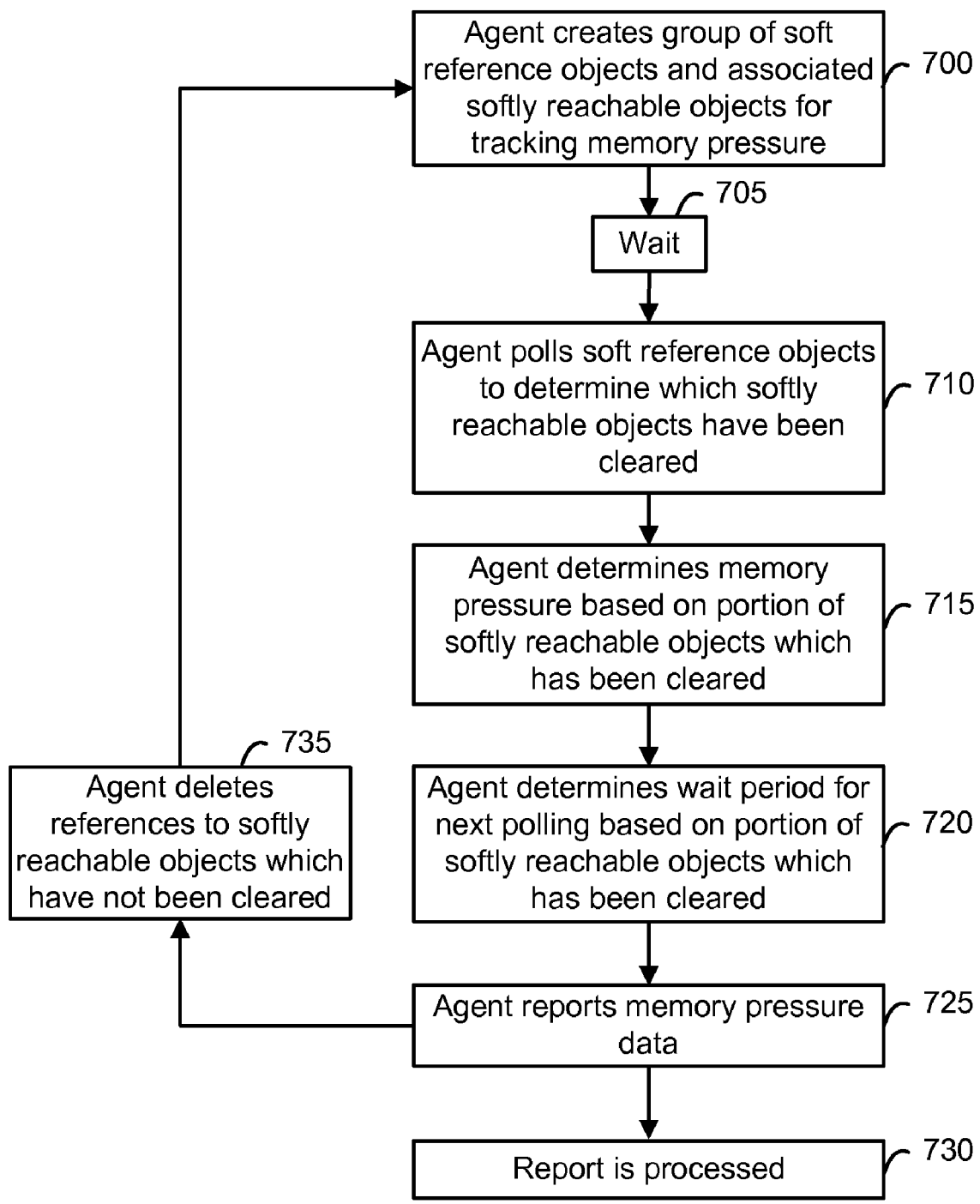
FIG. 7 depicts a process for determining a memory pressure based on a portion of a group of softly reachable objects which is cleared by a garbage collector.

FIG. 7 depicts a process for determining a memory pressure based on a portion of a group of reachable objects are created and a memory pressure is determined based on how many of the multiple softly reachable objects are cleared. Furthermore, a time period for determining how many of the multiple softly reachable objects are cleared can be set adaptively, e.g., based on the portion cleared in a prior check.

At step 700, the agent creates a group of soft reference objects and associated softly reachable objects for tracking memory pressure. After a wait period at step 705, which can be set to an initial value, the agent polls the soft reference objects to determine which softly reachable objects have been cleared, at step 710. At step 715, the agent determines a memory pressure based on a portion of the softly reachable objects which have been cleared, e.g., how many of the softly reachable objects have been cleared. For example, if ten softly reachable objects were created and zero or one were cleared, the memory pressure may be considered to be relatively light. Or, if nine of ten softly reachable objects were cleared, the memory pressure may be considered to be relatively heavy. Further, a memory pressure metric or score can be assigned, e.g., 90% when nine of ten softly reachable objects are cleared. A mapping from the portion of softly reachable objects which were cleared to the memory pressure metric can be linear or non-linear.

In another possible approach, the softly reachable objects differ in size so that the memory pressure determination can account for the sizes of the cleared objects, together with knowledge of the internal workings of the garbage collector. For instance, for a particular garbage collector, larger softly reachable objects may be garbage collected before smaller softly reachable objects when the memory is under relatively light pressure, and smaller softly reachable objects may be garbage collected before larger softly reachable objects when the memory is under relatively high pressure. In this case, if the collected softly reachable objects are relatively small in size, this indicates the memory pressure is relatively low. This technique can differentiate between a caution level and a danger level of a near out-of-memory condition.

At step 720, the agent determines a wait period for the next polling based, e.g., on the portion of the softly reachable objects which has been cleared or based on another memory pressure metric. For example, the wait period can be shorter when a relatively larger portion of the softly reachable objects have been cleared, indicating a relatively higher memory pressure. Conversely, the wait period can be longer when a relatively smaller portion of the softly reachable objects have been cleared, indicating a relatively lower memory pressure. That is, a finer-grained resolution may be desirable when the memory pressure is higher in order to determine problem states as closely and quickly as possible. Appropriate wait periods can be set based on the particular implementation. Alternatively, a fixed wait period can be used. At step 725, the agent reports memory pressure data to the application and, at step 730, the report is processed. At step 735, the agent deletes references to the softly reachable objects which have not been cleared (if any), and the process of steps 700-725 is repeated in a new pass. The wait period at step 705 in the new pass uses the value determined in the prior pass. Thus, a new group of softly reachable objects is created at step 700 in the new pass and polled at step 710 after the new wait period. The process can be repeated indefinitely as long as an out-of-memory error has not been thrown.

Figure 8:
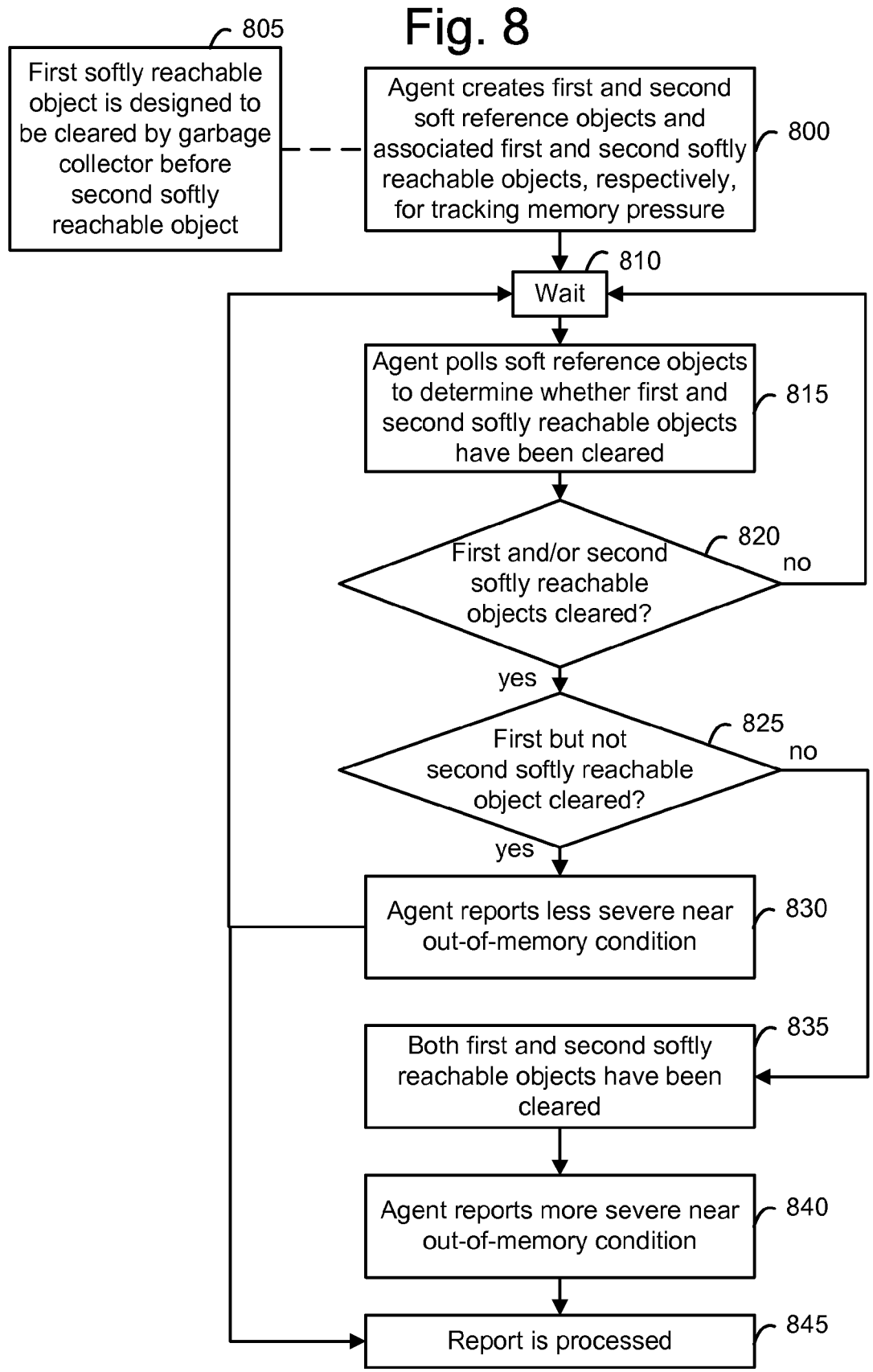
FIG. 8 depicts a process for predicting less severe and more severe out-of-memory conditions.

FIG. 8 depicts a process for predicting less severe and more severe out-of-memory conditions. In this approach, first and second softly reachable objects are created, where it is known that one of the objects is designed to be cleared by the garbage collector before the other. As a result, a near out-of-memory condition can be reported with different levels of severity, e.g., less severe or more severe. The concept can be extended to additional levels of severity as well.

At step 800, the agent creates first and second soft reference objects and associated first and second softly reachable objects, respectively, for tracking memory pressure. Step 805 indicates that the first softly reachable object is designed to be cleared by the garbage collector before the second softly reachable object. For instance, this maybe based on the relative sizes and/or ages of the softly reachable objects. After a wait period at step 810, the agent polls the soft reference objects to determine whether the first and second softly reachable objects have been cleared, at step 815. At decision step 820, if neither the first nor the second softly reachable objects are cleared, the wait period at step 810 and polling at step 815 are repeated. On the other hand, if one or both of the first and/or second softly reachable objects are cleared, a determination is made at decision step 825 as to whether the first but not the second softly reachable object is cleared. If this is true, the agent reports a less severe near out-of-memory condition at step 830. The condition is less severe because only the first softly reachable object, which is designed to be cleared first as an early indication of an out-of-memory condition, has been cleared. The report is processed at step 845 and the waiting and polling process is performed again starting at step 810.

On the other hand, if decision step 825 is false, this indicates that both the first and second softly reachable objects have been cleared, at step 835. In this case, the agent reports a more severe near out-of-memory condition, at step 840, and the report is processed, at step 845.

Figure 9:
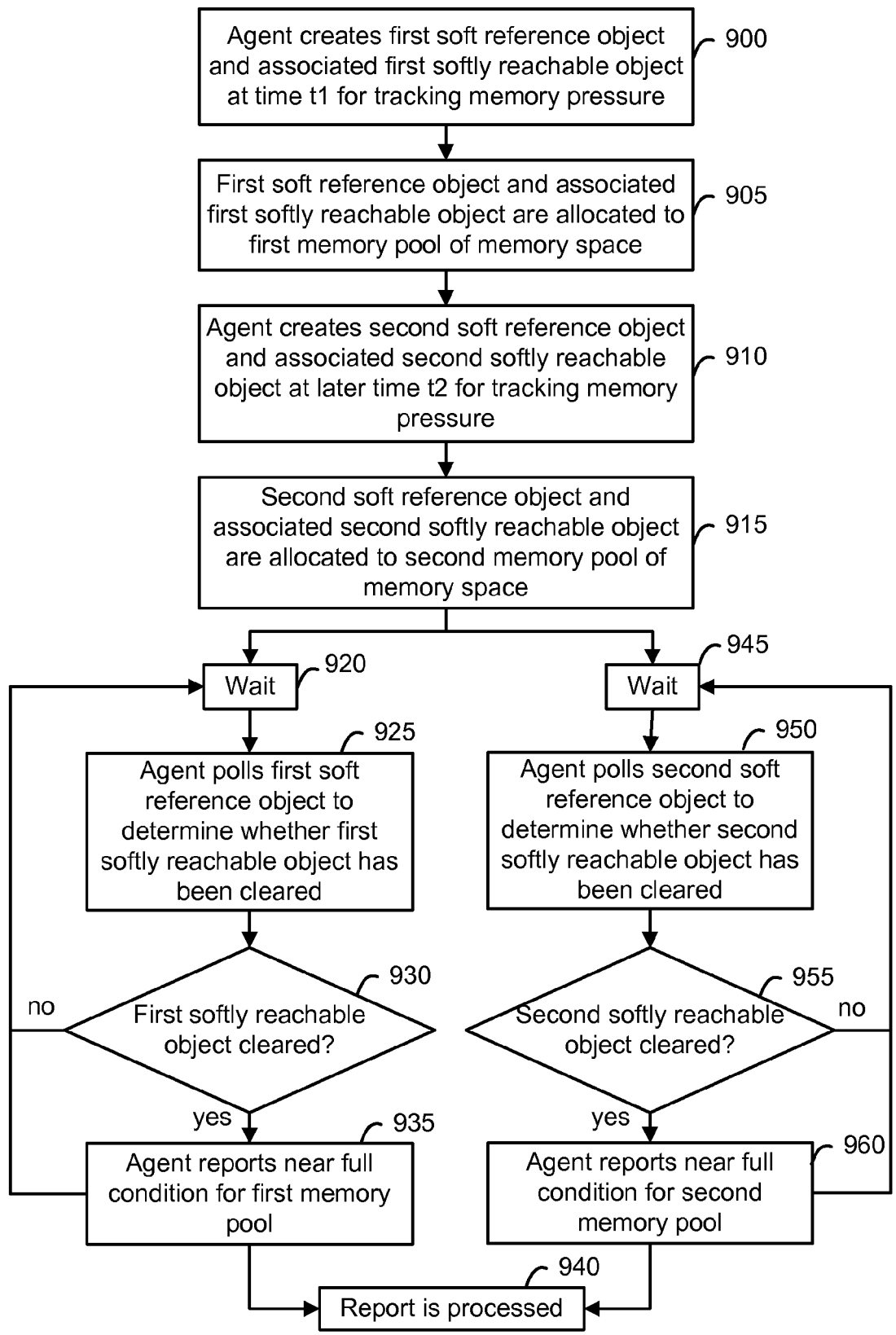
FIG. 9 depicts a process for predicting near full conditions for different memory pools of a memory space.

FIG. 9 depicts a process for predicting near full conditions for different memory pools of a memory space. In this approach, softly reachable objects are stored in different memory pools of the memory space to determine a memory pressure, e.g., a near full condition, separately for the different memory pools. A memory pool is an abstract representation of a chunk of memory allocated for use by a program. Memory pools can be created or removed during execution of an application and can be managed by one or more memory managers. In one approach, the memory pools are associated with different age regions, and softly reachable objects with different ages are created, e.g., at different times. This can be useful in better understanding the operation of the memory space. For example, it may be found that specific patterns of near full conditions in the different memory pools tend to lead up to an out-of-memory condition. Adjustment of memory pool boundaries, e.g., age region boundaries, or other actions may be made as a result.

For example, the Java heap uses different memory pools including Eden Space, which is a pool from which memory is initially allocated for most objects, Survivor Space, which is a pool containing objects that have survived garbage collection of Eden Space, Tenured Generation, which is a pool containing objects that have existed for some time in the Survivor Space, and Permanent Generation, which holds data needed by the virtual machine to describe objects that do not have an equivalence at the Java language level. For example objects describing classes and methods are stored in the Permanent Generation. Or, in another possible approach, three memory pools are used, where the Eden Space and Survivor Space are grouped in a younger pool, the Tenured Generation is considered to be a middle pool and the Permanent Generation is considered to be an older pool. Various other approaches are possible.

At step 900, the agent creates a first soft reference object and an associated first softly reachable object at time t1 for tracking memory pressure. At step 905, the first soft reference object and the associated first softly reachable object are allocated to a first memory pool of memory space, e.g., by the memory manager. At step 910, the agent creates a second soft reference object and an associated second softly reachable object at a later time, t2, for tracking memory pressure. At step 915, the second soft reference object and associated second softly reachable object are allocated to a second memory pool of the memory space. Next, polling and reporting can occur in parallel for the first and second softly reachable objects, in one possible approach. For instance, in one path, a wait period is implemented at step 920, and the agent polls the first soft reference object to determine whether the first softly reachable object has been cleared, at step 925. At decision step 930, if the first softly reachable object has been cleared, the agent reports a near full condition for the first memory pool, at step 935, and the report is processed at step 940. If the first softly reachable object has not been cleared, a wait is implemented again at step 920 followed by another polling at step 925.

Similarly, in a second path, a wait period is implemented at step 945, and the agent polls the second soft reference object to determine whether the second softly reachable object has been cleared, at step 950. At decision step 955, if the second softly reachable object has been cleared, the agent reports a near full condition for the second memory pool to the application, at step 960, and the report is processed at step 940. If the first softly reachable object has not been cleared, a wait is implemented again at step 945 followed by another polling at step 950.

The process of FIG. 9 can be modified based on one or more of the other concepts discussed previously, such as by providing multiple softly reachable objects in each memory pool, providing softly reachable objects of different sizes in each memory pools, and so forth.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for managing memory, comprising:

creating at least one object of a first type during a runtime of an application, a memory space is allocated for storing the at least one object and other objects of at least one other type which are created during the runtime of the application;

performing a garbage collecting process which is designed to clear the at least one object of the first type from the memory space when the memory space is close to an out-of-memory condition, wherein the first type is a type which is eligible to be cleared from the memory space by the garbage collecting process when the memory space is close to the out-of-memory condition, and the at least one other type is a type which is not eligible to be cleared from the memory space even when the memory space is close to the out-of-memory condition;

determining whether the at least one object of the first type has been cleared from the memory space by the garbage collecting process; and reporting regarding whether the memory space is close to the out-of-memory condition, responsive to the determining.

2. The computer-implemented method of claim 1, wherein:
the at least one object of the first type comprises at least one softly reachable object.

3. The computer-implemented method of claim 2, wherein:
the creating comprises creating at least one soft reference object which references the at least one softly reachable object.

4. The computer-implemented method of claim 3, wherein:
the determining comprises polling the at least one soft reference object to determine whether the at least one softly reachable object has been cleared from the memory space.

5. The computer-implemented method of claim 1, further comprising:
providing a user interface display, responsive to the reporting.

6. The computer-implemented method of claim 1, wherein:
the reporting comprises reporting that the memory space is close to the out-of-memory condition when the step of determining whether the at least one object of the first type has been cleared from the memory space determines that the at least one object of the first type has been cleared from the memory space.

7. The computer-implemented method of claim 1, further comprising:
initiating a graceful shutdown of the application, responsive to the reporting.

8. The computer-implemented method of claim 1, further comprising:
creating a new instance of the application, responsive to the reporting.

9. The computer-implemented method of claim 1, further comprising:
after the step of determining whether the at least one object of the first type has been cleared from the memory space determines that the at least one object of the first type has been cleared from the memory space, determining if an out-of-memory error for the memory space has been thrown;
if the step of determining if the out-of-memory error for the memory space has been thrown determines that the out-of-memory error for the memory space has not been thrown, creating at least one new object of the first type;
determining whether the at least one new object of the first type has been cleared from the memory space; and
reporting regarding whether the memory space is close to the out-of-memory condition, responsive to the determining whether the at least one new object of the first type has been cleared from the memory space.

10. The computer-implemented method of claim 1, wherein:
the memory space comprises one or more memory runtime environments.

11. The computer-implemented method of claim 1, wherein the at least one object of the first type is stored in a first memory pool of the memory space, the method further comprising:
creating at least a second object of the first type which is stored in a second memory pool of the memory space;
determining whether the at least a second object of the first type has been cleared from the memory space; and
responsive to the determining whether the at least one object of the first type has been cleared from the memory space, and the determining whether the at least a second object of the first type has been cleared from the memory space, reporting separately for the first and second memory pools regarding whether the first memory pool is close to being full and whether the second memory pool is close to being full.

12. The computer-implemented method of claim 11, wherein:
the reporting comprises reporting that the first memory pool is close to being full when the step of determining whether the at least one object of the first type has been cleared from the memory space determines that the at least one object of the first type has been cleared from the memory space, and reporting that the second memory pool is close to being full when the step of determining whether the at least a second object of the first type has been cleared from the memory space determines that the at least a second object of the first type has been cleared from the memory space.

13. A computer-implemented method for managing memory, comprising:
creating a group of objects of a first type during a runtime of an application, a memory space is allocated for storing the group of objects of the first type and other objects of at least one other type which are created during the runtime of the application, wherein the group of objects of the first type is created specifically for tracking whether the memory space is close to an out-of-memory condition;
performing a garbage collecting process which is designed to clear one or more objects of the group of objects of the first type from the memory space when the memory space is close to the out-of-memory condition;
determining one or more objects of the group of objects of the first type which have been cleared from the memory space by the garbage collecting process; and
reporting regarding whether the memory space is close to the out-of-memory condition, responsive to the determining.

14. The computer-implemented method of claim 13, wherein:
the group of objects of the first type comprises a group of softly reachable objects which are eligible to be cleared from the memory space by the garbage collecting process when the memory space is close to the out-of-memory condition, wherein the at least one other type is a type which is not eligible to be cleared from the memory space even when the memory space is close to the out-of-memory condition.

15. The computer-implemented method of claim 14, wherein:
the creating comprises creating a group of soft reference objects which reference the group of softly reachable objects.

16. The computer-implemented method of claim 15, wherein:
the determining comprises polling the group of soft reference objects to determine one or more objects of the group of softly reachable objects which have been cleared from the memory space.

17. The computer-implemented method of claim 13, further comprising:
reporting regarding a degree to which the memory space is close to the out-of-memory condition based on how many objects of the group of objects of the first type have been cleared from the memory space.

18. The computer-implemented method of claim 13, further comprising:
    initiating a graceful shutdown of the application, responsive to the reporting.

19. The computer-implemented method of claim 13, further comprising:
    determining a wait period based on how many objects of the group of objects of the first type are determined to have been cleared from the memory space;
    creating a new group of objects of the first type;
    waiting for the wait period before determining how many of the new group of objects of the first type have been cleared from the memory space; and
    reporting regarding whether the memory space is close to the out-of-memory condition, responsive to the determining how many objects of the new group of objects of the first type have been cleared from the memory space.

20. The computer-implemented method of claim 13, wherein:
    the group of objects of the first type includes at least first and second objects, the garbage collecting process is designed to clear the first object from the memory space before clearing the second object from the memory space, and the reporting comprises reporting that the memory space is closer to the out-of-memory condition when the step of determining determines that the first and second objects have been cleared from the memory space than when the step of determining determines that the first but not the second object has been cleared from the memory space.

21. The computer-implemented method of claim 20, wherein:
    the first and second objects of the first type have different sizes.

22. The computer-implemented method of claim 20, wherein:
    the first and second objects are stored in different memory pools of the memory space.

23. At least one processor readable storage device having processor readable code embodied thereon for programming at least one processor to perform a method, the method comprising:
    creating at least one object of a first type during a runtime of an application, a memory space is allocated for storing the at least one object and other objects of at least one other type which are created during the runtime of the application, wherein the at least one object of the first type is created specifically for tracking whether the memory space is close to an out-of-memory condition;
    performing a garbage collecting process which is designed to clear the at least one object of the first type from the memory space when the memory space is close to the out-of-memory condition;
    determining whether the at least one object of the first type has been cleared from the memory space by the garbage collecting process; and
    reporting regarding whether the memory space is close to the out-of-memory condition, responsive to the determining.

24. The at least one processor-readable storage device of claim 23, wherein:
    the at least one object of the first type comprises at least one softly reachable object.

25. The at least one processor-readable storage device of claim 24, wherein:
    the creating comprises creating at least one soft reference object which references the at least one softly reachable object.

26. The at least one processor-readable storage device of claim 25, wherein:
    the determining comprises polling the at least one soft reference object to determine whether the at least one softly reachable object has been cleared from the memory space.

27. The at least one processor-readable storage device of claim 23, wherein:
    the reporting comprises reporting that the memory space is close to the out-of-memory condition when the step of determining determines that the at least one object of the first type has been cleared from the memory space.

28. The at least one processor-readable storage device of claim 23, wherein the method performed further comprises:
    after the step of determining whether the at least one object of the first type has been cleared from the memory space determines that the at least one object of the first type has been cleared from the memory space, determining if an out-of-memory error for the memory space has been thrown;
    if the step of determining if the out-of-memory error for the memory space has been thrown determines that the out-of-memory error for the memory space has not been thrown, creating at least one new object of the first type;
    determining whether the at least one new object of the first type has been cleared from the memory space; and
    reporting regarding whether the memory space is close to the out-of-memory condition, responsive to the determining whether the at least one new object of the first type has been cleared from the memory space.

29. The at least one processor-readable storage device of claim 23, wherein the at least one object of the first type is stored in a first memory pool of the memory space, and the method performed further comprises:
    creating at least a second object of the first type which is stored in a second memory pool of the memory space;
    determining whether the at least a second object of the first type has been cleared from the memory space; and
    responsive to the determining whether the at least one object of the first type has been cleared from the memory space, and the determining whether the at least a second object of the first type has been cleared from the memory space, reporting separately for the first and second memory pools regarding whether the first memory pool is close to being full and whether the second memory pool is close to being full.

30. The at least one processor-readable storage device of claim 28, wherein:
    the reporting comprises reporting that the first memory pool is close to being full when the step of determining whether the at least one object of the first type has been cleared from the memory space determines that the at least one object of the first type has been cleared from the memory space, and reporting that the second memory pool is close to being full when the step of determining whether the at least a second object of the first type has been cleared from the memory space determines that the at least a second object of the first type has been cleared from the memory space.

31. The at least one processor-readable storage device of claim 23, wherein:
    the first type is a type which is eligible to be cleared from the memory space by the garbage collecting process when the memory space is close to the out-of-memory condition, and the at least one other type is a type which is not eligible to be cleared from the memory space even when the memory space is close to the out-of-memory condition.

32. At least one processor-readable storage device for managing memory, comprising:
creating a group of objects of a first type during a runtime of an application, a memory space is allocated for storing the group of objects of the first type and other objects of at least one other type which are created during the runtime of the application, wherein the first type is a type which is eligible to be cleared from the memory space by the garbage collecting process when the memory space is close to an out-of-memory condition, and the at least one other type is a type which is not eligible to be cleared from the memory space even when the memory space is close to the out-of-memory condition;
performing a garbage collecting process which is designed to clear one or more objects of the group of objects of the first type from the memory space when the memory space is close to an out-of-memory condition;
determining one or more objects of the group of objects of the first type which have been cleared from the memory space; and
reporting regarding whether the memory space is close to the out-of-memory condition, responsive to the determining.

33. The at least one processor-readable storage device of claim 32, wherein:
the group of objects of the first type comprises a group of softly reachable objects.

34. The at least one processor-readable storage device of claim 33, wherein:
the creating comprises creating a group of soft reference objects which reference the group of softly reachable objects.

35. The at least one processor-readable storage device of claim 34, wherein:
the determining comprises polling the group of soft reference objects to determine one or more objects of the group of softly reachable objects which have been cleared from the memory space.

36. The at least one processor-readable storage device of claim 32, wherein the method performed further comprises:
reporting regarding a degree to which the memory space is close to the out-of-memory condition based on how many objects of the group of objects of the first type have been cleared from the memory space.

37. The at least one processor-readable storage device of claim 32, wherein the method performed further comprises:
determining a wait period based on how many objects of the group of objects of the first type are determined to have been cleared from the memory space;
creating a new group of objects of the first type;
waiting for the wait period before determining how many objects of the new group of objects of the first type have been cleared from the memory space; and
reporting regarding whether the memory space is close to the out-of-memory condition, responsive to the determining how many objects of the new group of objects of the first type have been cleared from the memory space.

38. The at least one processor-readable storage device of claim 32, wherein:
the group of objects of the first type includes at least first and second objects, the garbage collecting process is designed to clear the first object from the memory space before clearing the second object from the memory space, and the reporting comprises reporting that the memory space is closer to the out-of-memory condition when the step of determining one or more objects of the group of objects of the first type which have been cleared from the memory space determines that the first and second objects have been cleared from the memory space than when the step of determining one or more objects of the group of objects of the first type which have been cleared from the memory space determines that the first but not the second object has been cleared from the memory space.

39. The at least one processor-readable storage device of claim 38, wherein:
the first and second objects of the first type have different sizes.

40. The at least one processor-readable storage device of claim 32, wherein:
the group of objects of the first type is created specifically for tracking whether the memory space is close to the out-of-memory condition.

41. A computer-implemented method for managing memory, comprising:
creating at least one object of a first type during a runtime of an application, a memory space is allocated for storing the at least one object and other objects of at least one other type which are created during the runtime of the application;
performing a garbage collecting process which is designed to clear the at least one object of the first type from the memory space when the memory space is close to an out-of-memory condition;
determining whether the at least one object of the first type has been cleared from the memory space;
providing a first report when the step of determining whether the at least one object of the first type has been cleared from the memory space determines that the at least one object of the first type has been cleared from the memory space, the first report indicating with a first degree of confidence that the memory space is close to the out-of-memory condition;
creating at least one new object of the first type after the step of determining whether the at least one object of the first type has been cleared from the memory space determines that the at least one object of the first type has been cleared from the memory space;
determining if the at least one new object of the first type has been cleared from the memory space at a prescribed time after the step of determining whether the at least one object of the first type has been cleared from the memory space determines that the at least one object of the first type has been cleared from the memory space; and
reporting in a second report with a higher degree of confidence than the first degree of confidence that the memory space is close to the out-of-memory condition when the step of determining if the at least one new object of the first type has been cleared from the memory space determines that the at least one new object of the first type has been cleared from the memory space.

42. At least one processor readable storage device having processor readable code embodied thereon for programming at least one processor to perform the computer-implemented method of claim 41.

* * * * *

UNITED STATES PATENT AND TRADEMARK OFFICE
CERTIFICATE OF CORRECTION

| | | |
|---|---|---|
| PATENT NO. | : 7,761,487 B2 | Page 1 of 1 |
| APPLICATION NO. | : 11/610085 | |
| DATED | : July 20, 2010 | |
| INVENTOR(S) | : Bansal | |

It is certified that error appears in the above-identified patent and that said Letters Patent is hereby corrected as shown below:

Col. 16, line 51: after "claim" and before "wherein" delete "28" and substitute therefor --29--

Signed and Sealed this
Eighteenth Day of January, 2011

David J. Kappos
*Director of the United States Patent and Trademark Office*